United States Patent [19]

Kaule et al.

[11] Patent Number: 4,463,970

[45] Date of Patent: Aug. 7, 1984

[54] SECURITY PAPER HAVING CAMOUFLAGE MATERIALS TO PROTECT ITS AUTHENTICITY FEATURES

[75] Inventors: Wittich Kaule, Gauting; Gerhard Schwenk, Puchheim; Gerhard Stenzel, Munich, all of Fed. Rep. of Germany

[73] Assignee: GAO Gesellschaft fuer Automation und Organisation mbH, Munich, Fed. Rep. of Germany

[21] Appl. No.: 326,365

[22] Filed: Dec. 1, 1981

[30] Foreign Application Priority Data

Dec. 23, 1980 [DE] Fed. Rep. of Germany ....... 3048734

[51] Int. Cl.$^3$ .............................. B42D 15/00
[52] U.S. Cl. ......................... 283/72; 283/75; 427/7; 427/157
[58] Field of Search ............... 427/7, 157; 283/8 R, 283/72, 75

[56] References Cited

U.S. PATENT DOCUMENTS

| 3,713,861 | 1/1973 | Sharp | 427/7 |
| 4,120,445 | 10/1978 | Carrier et al. | 427/7 |
| 4,277,514 | 7/1981 | Sugiura et al. | 427/7 |

FOREIGN PATENT DOCUMENTS

| 1170965 | 11/1969 | United Kingdom . |
| 1338893 | 11/1973 | United Kingdom . |
| 1424442 | 2/1976 | United Kingdom . |
| 1439173 | 6/1976 | United Kingdom . |
| 1534403 | 12/1978 | United Kingdom . |
| 2016370 | 9/1979 | United Kingdom . |

*Primary Examiner*—Norman Morgenstern
*Assistant Examiner*—Janyce A. Bell
*Attorney, Agent, or Firm*—Schwartz, Jeffery, Schwaab, Mack, Blumenthal & Koch

[57] ABSTRACT

A data carrier having excitable marking materials to record information in code and further materials to camouflage them, as well as a method of producing this type of data carrier. The coded information is given in the form of the local presence or absence of the excitable marking materials, and is read by detecting the state of excitation, which can only be done with difficulty. The camouflage materials have the function of preventing the detection of the marking material pattern indirectly by means of a chemical laboratory analysis; this camouflage is successful when materials are used which are very similar chemically to the marking materials, and in particular yield the same results as these in a chemical laboratory analysis, but are not excitable with the same means or in the same manner.

21 Claims, No Drawings

SECURITY PAPER HAVING CAMOUFLAGE MATERIALS TO PROTECT ITS AUTHENTICITY FEATURES

The invention concerns a data carrier having information coded by the presence and/or absence of excitable marking substances at predetermined locations on the data carrier, and having further materials added to camouflage the marking substances; it also concerns a method of producing this type of data carrier and a method for protecting information coded on data carriers by the presence and/or absence of excitable marking substances at predetermined locations on or in the data carrier.

Data carriers as specified for this invention are security papers such as identification cards and paper of monetary value, as well as checks, check cards, banknotes and so on.

This type of security paper, especially the paper of monetary value, must of course be protected by special security features against imitation, forgery and abuse. These security features generally have the character of information that can comprise one or more bits. Information can have a classificatory or an identifying function, as far as this invention is concerned. Information is classificatory, for example, when it determines the credit volume of credit cards, indicates a difference in value for banknotes or regulates access to certain restricted areas for permits. Classifying information, as far as this invention is concerned, proves that the data carrier is a genuine specimen of a group of equivalent documents. In the most simple case one-bit information merely guaranteeing the authenticity of the document as an authenticity mark suffices for this purpose.

On the other hand, identifying information according to the invention proves that the data carrier involved is a certain specimen of a group of equivalent data carriers. An example of such information is the serial number of banknotes and similar documents.

The invention does not concern all information that can be used to guarantee the authenticity of documents; it is limited to information present in a coded form. This information is especially suitable for the protection of security papers that can be used in automata because testing devices can detect and process coded information particularly well.

The information concerned by the invention is thus basically different from known authenticity information such as water-marks or steel intaglio engraving provided for visual testing. The authenticity guarantee of these conventional features is based on the great handicraft skill necessary for their production and on the great technical resources required which are generally not available to the forger.

The security of documents protected with coded information also depends essentially on the forger not succeeding in forging the authenticity information, or at least in imitating it to the extent that it is recognized as authentic by the testing device. This can be achieved in practice by using unusual materials that are very difficult to obtain as marking materials and/or by a very elaborate production technology for same and/or by focussing on features of the marking materials which are very difficult to detect by test methods and are furthermore selected in such a way that the composition of the marking material cannot be simply deduced from them.

It is advantageous to select marking materials which are not detectable visually and whose qualities which are used for marking cannot be detected by the human senses. Furthermore, it is a great advantage for the guarantee of authenticity when the marking material can neither be identified by its physical properties nor by its chemical properties.

This type of marking material as well as steps for camouflaging their physical properties are known in expert circles. They are therefore not the object of this invention. The object of this invention is the camouflage of chemical properties of marking materials that are known as such.

The German published application No. 12 61 790, for example, describes the marking of banknotes with radioactive and/or activatable substances.

Their radiation is analyzed as to intensity for energy for authenticity testing. The identification of the marking materials due to their physical properties is made difficult by the use of several substances in a mixture. Documents provided with this type of feature are not protected against the recognition of the marking substances by means of a chemical analysis.

The Swiss patent application No. 194 466 also provides steps to prevent the identification of the feature material due to its physical properties. The patent teaches the protection of banknote paper by fluorescent materials having a characteristic emission spectrum. Taking the advanced state of development of fluorescence analysis into account, the identification of the feature material due to its emission spectrum is made difficult by the fact that the feature material is bound to the paper fibers by a fixative, which itself can be a fluorescent material. Thus a "mixed fluorescence" arises, whose underlying marking materials cannot easily be deduced from its spectral behavior.

This protection method of 1938 no longer meets today's requirements; furthermore, a coding going beyond one-bit information cannot possibly be protected in the way depicted. The detection of the feature material on the basis of its physical properties is only made difficult; it is not ruled out. This type of document is not at all protected against the identification of the feature material on the basis of its chemical properties.

In the Swiss patent application No. 516 196 data carriers, e.g. banknotes, are coded with narrow-band luminescent marking materials. The code consists of the presence and/or absence of certain luminophores which can clearly be detected on the basis of their very narrow-band emission lines. The luminophores used for this purpose are chiefly rare earth metal chelates which predominantly emit in the visible range of the optical spectrum (VIS).

The luminescence coding described in the patent application is very well suited for the automatic reading of documents; but the coded information is not protected against forgery and falsification within the scope of the invention stated. The luminophores themselves are invisible, if possible, and thus not detectable, but they emit in the VIS when excited and can therefore be noticed. The detection of the composition of the marking materials can then be carried out with the methods of chemical analysis, although it is difficult. The term "chemical analysis" here and in the following refers to all methods which are usually used to detect the chemical composition of a material.

It was therefore worthwhile to find steps with which data carriers which are coded with marking materials can be protected against this type of analysis.

In the meantime methods have become known with which this type of data carrier can be protected against an analysis on the basis of its physical properties. For this purpose other materials are added to the marking materials to camouflage them. These camouflage materials are, for example, also luminophores in whose emission spectrum the signal used in coding is to be concealed.

This can take place in two ways. Firstly, wide-band emitting, e.g. organic, luminophores are used to camouflage the characteristic emission line which can then only be noticed as a small tip added onto the emission spectrum of the camouflage material. Alternatively, one or more narrow-band luminophores are added to the marking material, which emit at other wavelengths and whose emission lines are not evaluated in the authenticity test. Since the forger cannot at first distinguish between the marking materials and the camouflage materials, the analysis as well as the imitation are essentially obstructed due to the complexity of the data measured.

All known methods in prior art have in common that they do not offer protection against the idenfication of the chemical composition and the structure of the marking material. This is especially true when the information is not one-bit information, i.e. an authenticity feature, but rather several-bit information, i.e. a password in the sense described above.

Due to the necessity of completely protecting money-value paper, in particular, against forgery, falsification and abuse, it is thus a worthwhile goal to prevent the possibilities of chemical analysis which can be the basis for forgery or falsification.

It is therefore the problem of this invention to protect information coded on data carriers by marking materials against detection, reading and material analysis by means of chemical examination methods. This problem is solved by the characterizing part of the main claim. Developments of the invention can be found in the subclaims.

According to the basic idea of the invention the data carrier is provided additionally with materials to camouflage the excitable marking materials, which camouflaging materials yield the same results as the marking materials in a chemical analysis but which are not excitable like the marking materials, or at least not with the same means and in the same way. These camouflaging materials are deposited at the same places as the marking materials, or between such places.

When the code is carried out e.g. as a bar code, the bars carrying the information consist of marking materials and the camouflaging materials can fill up the intervals between the bars. Then one cannot distinguish between the code bars and the camouflage bars with chemical means. At the most a regular surface or a regular pattern of the same material can be detected and no information can be discovered in it.

If there were no camouflage bars, on the other hand, one could try to discover the code pattern with good chances of success by dividing the data carrier up into small fields and analyzing each one of these. For this purpose the material quantities used for the analysis can be increased, if necessary, by dividing several equivalent documents up in the same way and bringing the corresponding fields together.

There are of course no restrictions concerning the code patterns. Thus the use, e.g., of a matrix pattern is possible with the same advantage. This matrix pattern can have the form of a chessboard pattern, in the most simple case, into which the coding is printed. The fields which are not acted upon by marking material due to the coding, are provided with camouflage material according to the invention. If the camouflage material is printed precisely between the marked areas, the entire information-carrying surface appears chemically homogeneous.

It is essential to this invention that the identification of the camouflage and marking materials on the basis of a chemical analysis does not lead to the properties used for marking. It is also possible to do without a certain, predetermined form of marking such as bars, squares and so on and just simulate the code sign areas themselves. For example, the marking material and the camouflage material can be added to the ink with which the figures of a serial number are printed. The information is then present as binary information according to the figures provided with marking material in relation to the figures provided with camouflage material.

Up to now information which testifies to the authenticity of a data carrier by classifying or identifying it in the manner of a password has been dealt with. An appropriate possiblity of application is to differentiate between the values of various subgroups of a system of money-value papers such as bank-notes.

In the special case of the authenticity feature, only one bit-field which records whether the document is authentic or not is provided for the entire information. In this case it is perfectly clear that the protection according to the invention can also be carried out by applying the camouflage material to the same place as the marking material. The forger then finds during his investigations a multi-component system at these places which is naturally more difficult to analyze chemically and also requires considerably greater resources to imitate and forge, in case he should succeed in analyzing the feature.

It is not necessary, of course, that the marking material or the camouflage material be applied to or printed onto the surface of the data carrier.

Especially in the case of data carriers made of paper, it may be advantageous in certain cases to introduce the marking material and the camouflage material into the paper pulp. This can be done, for example, by adding the appropriate materials to the pulp during the preparation of the paper or with the help of ink-jet printing groups into the web on the paper machine before it is drained, as described in detail, for example, in the German application No. 29 05 441 of this applicant.

Marking materials to be used for this invention are already stated in prior art. The invention concerns camouflaging these materials against the identification of their chemical properties.

If radioactive isotopes are used for marking, the corresponding non-radiant and/or non-activatable isotopes are to be used as camouflage materials according to the invention. These isotopes cannot, of course, be separated from the marking materials by chemical methods. When chemically equivalent camouflage materials are applied to the bit-fields not treated with marking materials, the information cannot be obtained with chemical methods.

When narrow-band emitting luminophores are used as the marking material, as present chiefly in rare earth metal ions in appropriate fundamental lattices, camouflage materials are used which cannot be distinguished—or only with great difficulty—from the marking materials and still do not have the same luminescent properties as the marking materials or, if possible, do not luminesce at all. It must first be noted that the rare earth metals are only distinguished by a different occupation of inner electron shells and thus show very similar chemical behavior. They are therefore extremely difficult to separate with chemical methods. It is quite obvious that an analysis which itself is very difficult, can be made even more difficult by increasing the number of similar components.

However, one is not just limited to making the chemical analysis difficult; one can also make it totally impossible by choosing the components properly. For this purpose the camouflage and marking materials should be selected in such a way that they are impossible to distinguish by the methods of chemical analysis as defined above.

The properties of the luminophores used for marking are high-bred and normally not present in this way. The production of camouflage materials according to the invention is thus successful when certain steps of the production method are modified for the specific marking materials. In the following three important methods are described.

It is known that in the production of this type of luminescent material very slight impurities with so-called "luminescence killers" like heavy metals may suffice to prevent the luminescence of these luminophores; the slight amounts of luminescence killers cannot be detected by chemical analysis.

Furthermore, the mechanical disturbances caused by the grinding processes in the production of the luminophores can lead to the luminescence emission decreasing to a uselessly small level of intensity. In order to obtain usable luminophores, the corresponding powders must be subjected after grinding to a suitable temperature treatment. If this is not done, a suitable camouflage material according to the invention is obtained for the corresponding marking material.

The production process can also be conducted in such a way that the rare earth metals are not incorporated into the lattices provided, but rather merely mixed with the corresponding lattices in the form of other compounds such as rare earth metal oxides. The same chemical components are present in this type of mixture, so that it cannot be distinguished chemically from a corresponding fluorescent material; but since the lattice and the rare earth metal ion cannot interact physically, this type of mixture does not show any luminescence emission. The procedures stated and further feasible steps to prevent luminescence, which are usually avoided at all costs, result in the production of camouflage materials that can be used according to this invention.

Thus the first simple method of camouflaging luminescent codes against chemical analysis is disclosed.

A rare earth metal luminophore is developed and a suitable camouflage material is produced at the same time according to one of the methods described, or a combination thereof. When this camouflage material is printed into a coding pattern alternately with the marking material, the impression of a uniform pattern that cannot contain any information arises if a chemical investigation is carried out.

Of course, not only a one-component system can be used as the marking material or the camouflage material; in exactly the same way material compounds can be used as the marking or camouflage material which contain several active or inactive components and thus confuse the matter for the forger even more.

The above are very useful and effective camouflages, which suffice for most practical problems, in the case of information coded luminescently in the form of a password.

On the other hand, to camouflage one-bit information, i.e. authenticity features, further improvements which go beyond the use of multi-component systems for the marking material and the camouflage material in the manner described above, are desirable.

A particularly valuable method of camouflaging coded information with camouflage materials according to the invention makes use of marking materials and corresponding camouflage materials each containing activatable as well as non-activatable components.

The marking and camouflage materials consist here of the same components and thus cannot be distinguished by a chemical analysis. However, as the marking material contains different components in an activatable form as does the camouflage material, it is still possible to distinguish them with physical means.

By using the same rare earth metal ions and/or ion pairs in excitable and non-excitable components, the differences can be limited to physical effects of a higher order and thus the physical properties as well as the chemical properties of the marking materials can be effectively camouflaged at the same time. The expert knows that this can be carried out in the same way with greater numbers of components.

For this purpose a material A is produced, for example, containing a rare earth metal ion S in a lattice $W_1$, which is to be shown as follows: $A \doteq S - W_1$. The material can be produced in an excitable way, i.e. so it is capable of luminescence; then it is marked by an asterisk: $A^* \doteq S^* - W_1$. Or it can be produced in a non-excitable, i.e. non-luminescent form: $A \doteq S - W_1$; and then it is shown without an asterisk. In the same way a second material B is produced by incorporating the same rare earth metal ion S into another lattice $W_2$, whereby the two variants are shown again as $B^* \doteq S^* - W_2$ for the excitable one (plus asterisk) and $B \doteq S - W_2$ for the non-excitable one (without an asterisk).

The combination A*B can be used, for example, for logic 1 in the coding and the combination B*A for logic 0. Of the two combinations, one corresponds to the designation "marking material" used up to now and the other corresponds to the designation "camouflage material". It is obvious that both materials are chemically equivalent. Their emission spectra differ only in details of a higher order, as opposed to the camouflage systems. Thus the emission lines are at almost the same place in both cases. They may differ in intensity, decay time and similar spectra details that are difficult to specify, when the lattice is selected accordingly. Nonetheless it possible for the expert to use these characteristic details of the spectra for testing with known means, as long as he is acquainted with the system used as marking material and camouflage material. With the camouflage method described here, multiple-bit information can be protected extremely effecitvely against forgery, falsification and abuse, because the physical as well as the chemical properties of the marking materials are identical to those of the camouflage materials except for effects of a higher order. The forger will thus not be able to detect a difference between the camouflage material and the marking material by physical or by chemical means, even in a very expert and thorough examination. Thus he will not be able to read or forge the information.

The system stated also protects one-bit information, i.e. authenticity features, to a large degree; when, for example, the combination A*B stands for authentic, the forger cannot tell with physical or with chemical investigations whether the authenticity feature is the combination A*B or B*A. Even if he should come to know this in part, he would probably try to develop a material A*B* as an imitation, which would also be noticed in the authenticity test. The lattices $W_1$ and $W_2$ in this camouflage method can be very similar compounds differing, for example, only in the stoichiometry, but they can also be non-crystalline materials, e.g. glass. It can also be advantageous to assemble one of the lattices ($W_1$) from only one part of the components of the other lattice ($W_2$) and deposit the rest of the components (of $W_2$) in the heterogeneous mixture without any effect on the luminescence. In the example 4 that follows this type of embodiment of the invention is described in detail.

It is still possible to increase the protective value of the marking and camouflage material system even more. It is known in the patent literature that this type of luminescence coding can also be carried out with quasiresonant luminophores. Quasiresonant luminophores are understood to be luminophores which are exclusively excitable in a narrow wavelength range and emit in the same or immediately adjacent range. In the case of these luminophores the emission is concealed or camouflaged by the excitation light which is orders of magnitude more intensive. Unlike usual luminophores the luminescent light cannot be simply separated from the excitation light, for example, by spectral ranges. Therefore the luminescence emission of these luminophores cannot be detected or measured by standard spectrographic procedures either. Very meticulous test devices are necessary to detect this type of emission, which is possible, for example, by means of the time of persistence. If these quasiresonant luminophores which are known as such are used for marking and camouflaging information in the above-mentioned multi-component system, a protection method is realized which can practically be termed unfalsifiable.

In the following the invention is described in more detail on the basis of four examples.

EXAMPLE 1

A luminophore suitable for a marking material with the chemical formula $Y_{2.8}Fe_4In\ O_{12}:Er_{0.2}$ is produced as follows: 63.22 g yttrium oxide, 7.65 g erbium oxide, 64 g iron oxide, 27.76 g indium oxide and 60 g dehydrated sodium sulfate are homogenously mixed, heated to 840° C. for 6 hours in an alumiminum oxide crucible, ground again and heated to 1100° C. for another 14 hours.

After cooling the reaction product is ground, the flux is washed out with water, and it is air-dried at 100° C. To obtain as fine a grain as possible, the powder is then ground in a stirred ball mill. A light green powder with an average grain size less than 1 $\mu m$ is obtained, which luminesces in the infrared at 1.5 $\mu m$ when excited by visible light.

To produce an offset printing ink having luminophore and camouflage materials used according to the invention, 100 g of an oil-modified urethane alkyd resin, 10 g zirconium octoate, 60 g scouring paste, 160 g bleached linseed oil, 250 g phenol-modified collophonium resin and 210 g high-boiling non-aromatic mineral oil are now homogeneously mixed in a three-roll mill. 100 g of the luminophore $Y_{2.8}Fe_4In\ O_{12}:Er_{0.2}$ along with 100 g of the camouflage material described below and 100 g of the color pigment hostaperm blue AR (trade mark of Hoechst) are added to this varnish. The printing ink produced in this way has an intensive blue color like the pigment used.

For the camouflage material zinc oxide, a zinc sulfide activated with copper, is mixed with a metal mixture oxide containing cerium, neodymium, lanthanum, terbium, samarium and traces of other elements. The commercial luminous pigment zinc sulfide shows wide-band luminescence with a green color and thus camouflages additionally without disturbing the detection of the marking material.

If security paper printed with this ink is chemically decomposed in sufficient amounts and investigated as to its composition, one can only recognize—even on the basis of qualified work with appropriate equipment—that almost all rare earth metals are present in the same concentration along with some other elements. It is practically impossible to deduce the marking material from the analysis data.

EXAMPLE 2

$Y_{2.8}Fe_4In\ O_{12}:Er_{0.2}$ is also produced here as the marking material as in example 1.

For the production of the corresponding camouflage material the same basic materials in the same composition are mixed homogeneously and heated to 800° C. for 6 hours in an aluminum crucible. After grinding again there is no further temperature treatment.

The camouflage material produced in this way does not show any noticeable luminescence emission in the IR. Information in the form of a bar code is printed onto paper with the marking material. The code pattern is completed in the second printing cycle when camouflage material is printed into the places not treated with marking material. The surface treated in this way exhibits the same chemical properties; the information is therefore not detectable by chemical means. On the other hand, only the marking material bars show luminescence emission in the IR at 1.5 $\mu m$ after being excited accordingly. The information can still be read by the appropriate means due to this difference in the physical properties of the marking and camouflage materials.

EXAMPLE 3

$Y_{2.8}Fe_4In\ O_{12}:Er_{0.2}$ is also produced here as the marking material as in example 1.

The compound $(La_{0.45}Y_{0.3}Nd_{0.04}Dy_{0.2}Er_{0.01})_2O_2S$ is synthesized crystallinely as the camouflage material in the known manner by burning the corresponding rare earth metal oxides in the presence of flux containing sulfur. The marking material and camouflage material are added to the paper pulp as an aqueous suspension during the production of the paper. Paper produced in this way, when incinerated and analyzed chemically, allows at the worst for the discovery that almost all rare earth metals are present as components. One cannot deduce the marking material from the analysis data here either.

EXAMPLE 4

A camouflage system is produced from the luminescent marking material $Gd_{1.95}Eu_{0.5}O_3/B_2O_3$ and an equally luminescent amorphous camouflage material $Gd_{1.95}Eu_{0.05}O_3 \cdot B_2O_3$, whereby the marking and camouflage materials differ in their decay time but not in their chemical summation formula or in the wavelength of the emission line.

The marking material $Gd_{1.95}Eu_{0.05}O_3/B_2O_3$ is produced in the following way:

Europium-activated gadolinium oxide is produced in the known way by precipitating the oxalates out of the aqueous solution of the chlorides. The oxalates are decomposed to the mixed oxide in air at 1000° C. 36.2 g of the gadolinium oxide obtained in this way and activated with europium are mixed with 20 g boric acid to a homogeneous powder showing strong red fluorescence when radiated with UV light and having a half-life time of 8 ms.

To produce the amorphous camouflage material $Gd_{1.95}Eu_{0.05}O_3 \cdot B_2O_3$, 35.34 g $Gd_2O_3$, 0.88 g $Eu_2O_3$ and 20 g boric acid are homogeneously mixed and heated to 1150° C. for 30 minutes in a platinum crucible. After cooling to room temperature a colorless product is obtained which is crushed and then ground to a fine powder in a ball mill. It shows strong red fluorescence with a half-life time of 2 ms in UV light.

Both components show strong red fluorescence in UV light, which differs, however, considerably in its half-life time. Both components show the same elementary composition in a careful chemical analysis.

What is claimed is:

1. A data carrier comprising:
    a substrate;
    luminescent marking material on said substrate forming coded information, said luminescent marking material comprising chemical elements in a first configuration having a first luminescent characteristic; and
    camouflaging material on said substrate, said camouflaging material comprising said chemical elements, said same chemical elements being in a second configuration having no luminescence or a luminescent characteristic different from said first luminescent characteristic.

2. The data carrier of claim 1, wherein said coded information is present in the form of a bar code.

3. The data carrier of claim 1, wherein said coded information is present in the form of a matrix code.

4. The data carrier of claim 1, wherein said luminescent marking material and said camouflaging material are selected to identify a predetermined value of banknote.

5. The data carrier of claim 1 wherein said luminescent marking material is present on said substrate in a plurality of locations and said camouflaging material is present on said substrate in locations between the locations of said luminescent marking material.

6. The data carrier of claim 5, wherein said camouflaging material is present fitting precisely into the intervals which were left open by said luminescent marking material.

7. The data carrier of claim 6, wherein said coding is impressed into visually recognizable printed forms bearing additional information.

8. The data carrier of claim 1 wherein said chemical elements of said camouflaging material are present in the same weight ratio as said chemical elements in said luminescent marking material.

9. The data carrier of claim 1, wherein said luminescent marking material is excitable with invisible light and emits only invisible light.

10. The data carrier of claim 9, wherein said excitation and emission take place in the infrared range of the optical spectrum.

11. A method of producing a data carrier comprising applying a first marking material to a substrate, said first marking material containing an activatable component, applying a second marking material chemically indistinguishable from said first marking material to said substrate, subjecting said substrate to means for activating said activatable component in said first marking material.

12. The method of claim 11, wherein said first and second marking materials are added to the surface of said substrate.

13. The method of claim 11, further comprising adding heavy metals as luminescence killers to said second marking material.

14. The method of claim 11, wherein said subjecting to activation step comprises a temperature treatment of said substrate.

15. The method of claim 11, wherein said subjecting to activation step comprises a treatment of said substrate to radiation in a predefined range.

16. A data carrier comprising:
    a substrate;
    luminescent marking materials in said substrate forming coded information, said luminescent marking material comprising lanthanide ions containing in host lattices to exhibit characteristic luminescence; and
    camouflaging material on said substrate, said camouflaging material comprising lanthanide ions having no luminescence or a luminescent characteristic different from said characteristic luminescence.

17. The data carrier of claim 16 wherein said luminescent marking material and said camouflaging material are present in the same locations on said substrate.

18. The data carrier of claim 16 wherein said luminescent marking material is excitable with invisible light and emits only invisible light.

19. The data carrier of claim 18 wherein said excitation and emission take place in the infrared range.

20. The data carrier of claim 16, wherein said coded information discloses data in the form of an account number.

21. The data carrier of claim 16, wherein said camouflage material contains all, or almost all the rare earth metals in lattices.

* * * * *